(12) United States Patent
Sadovsky et al.

(10) Patent No.: US 7,322,035 B2
(45) Date of Patent: *Jan. 22, 2008

(54) SIMPLIFIED DEVICE DRIVERS FOR HARDWARE DEVICES OF A COMPUTER SYSTEM

(75) Inventors: Vladimir Sadovsky, Bellevue, WA (US); Franc J. Camara, Redmond, WA (US); Keisuke Tsuchida, Redmond, WA (US); Lyman Cooper Partin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/276,481

(22) Filed: Mar. 1, 2006

(65) Prior Publication Data

US 2006/0133878 A1 Jun. 22, 2006

Related U.S. Application Data

(63) Continuation of application No. 09/809,237, filed on Mar. 15, 2001, now Pat. No. 7,047,534.

(60) Provisional application No. 60/190,457, filed on Mar. 17, 2000.

(51) Int. Cl.
*G06F 9/46* (2006.01)

(52) U.S. Cl. .................... 719/321; 719/327
(58) Field of Classification Search ............. 719/321, 719/327
See application file for complete search history.

(56) References Cited

U.S. PATENT DOCUMENTS 5,265,252 A 11/1993 Rawson, III et al.
5,727,212 A * 3/1998 Dinallo ................. 719/321

* cited by examiner

*Primary Examiner*—Meng-Al T. An
*Assistant Examiner*—Camquy Truong
(74) *Attorney, Agent, or Firm*—Lee & Hayes, PLLC

(57) ABSTRACT

A computer system uses simplified device drivers for operating hardware devices. A simplified device driver for a hardware device of a given device type, such as a flatbed scanner, works with a system-supplied common driver for that given device type. The common driver and the simplified driver together function like a regular device driver. The simplified device driver implements a small number of entry point functions corresponding to a pre-selected set of operation commands "generic" to hardware devices of that given device type. When an application makes a request for an operation by the device, the request is passed through a device driver interface (DDI) to the common driver. The common driver then calls the entry point functions in the simplified device driver to carry out the requested operation.

14 Claims, 3 Drawing Sheets

SIMPLIFIED DEVICE DRIVERS FOR HARDWARE DEVICES OF A COMPUTER SYSTEM

CROSS-REFERENCE TO RELATED APPLICATIONS

This application is a continuation of and priority is claimed to U.S. Pat. No. 7,047,534, which issued from U.S. patent application Ser. No. 09/809,237, a filing date of Mar. 15, 2001, for "SIMPLIFIED DEVICE DRIVERS FOR HARDWARE DEVICES OF A COMPUTER SYSTEM" of Sadovsky, which claims priority from U.S. Provisional Patent Application Ser. No. 60/190,457, filed Mar. 17, 2000. This Non-Provisional United States Patent Application is commonly assigned herewith and is hereby incorporated herein by reference for all that it discloses.

TECHNICAL FIELD OF THE INVENTION

This invention relates generally to computer operating systems, and more particularly to software components for communicating with and controlling the operation of a computer hardware device, such as a scanner.

BACKGROUND OF THE INVENTION

A computer system employs hardware devices for various functions, such as data input and output, printing, display, etc. Each hardware device in the computer system is typically operated through its associated device driver, which is typically provided by the vendor of the hardware device and loaded as part of the operating system. The device driver allows the operating system of the computer and applications running on the computer to communicate with the device and control its operations. The device driver is device-specific in that it is written to handle the specific behavior of the device. On the other hand, the device driver also has to be written according to specifications and requirements of the operating system with which the driver is to be used.

Although the quality of the device driver for a hardware device is critical to the proper operation of the device, many hardware vendors find it difficult to put in the significant time and resources needed to adequately develop a device driver. As a result, device drivers provided by hardware vendors are often of unsatisfactory quality and require extensive fixing before they can be used with the operating system. This problem is especially significant for models with low profit margins. For example, flatbed color scanners are commonly used for capturing color images for incorporation in presentations and communications. Some low-end models of flatbed scanners have rather low retail prices, which limit the resources their vendors could reasonably spend on writing device drivers for them.

The difficulty in obtaining well-developed device drivers is exacerbated by the need to include many device drivers with an operating system. One of the goals of modern operating systems is to provide an "out-of-the-box" experience, where an end user can simply connect a device to her computer and the device will work without the need to install any extra software. To provide such an experience, an operating system typically includes many device drivers from different hardware vendors. Due to the large number of device drivers involved, the time and resources required to test and fix the drivers to ensure their proper operations can become unacceptably high. Accordingly, there is a need for a new approach in developing device drivers that makes it significantly easier for hardware vendors to develop high-quality device drivers.

SUMMARY OF THE INVENTION

In view of the foregoing, the present invention provides a computer system that allows the use of simplified device drivers for operating hardware devices. A simplified device driver for a hardware device of a given type, such as a flatbed scanner, works with a common driver provided for that given type, and together they function like a regular device driver. The simplified device driver implements entry point functions for a small set of pre-selected operation commands "generic" to different device models and brands of that given device type. When an application makes a request for an operation by the device, the request is passed through a device driver interface (DDI) to the common driver. The common driver then calls the entry point functions in the simplified device driver to control the device to carry out the requested operation. Because a simplified device driver only has to implement a small number of entry point functions for generic device operation commands, it is significantly less complicated than a regular device driver that has to handle various driver interface functions required by the operating system. As a result, it is much easier for a hardware vendor to develop a high-quality simplified device driver.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
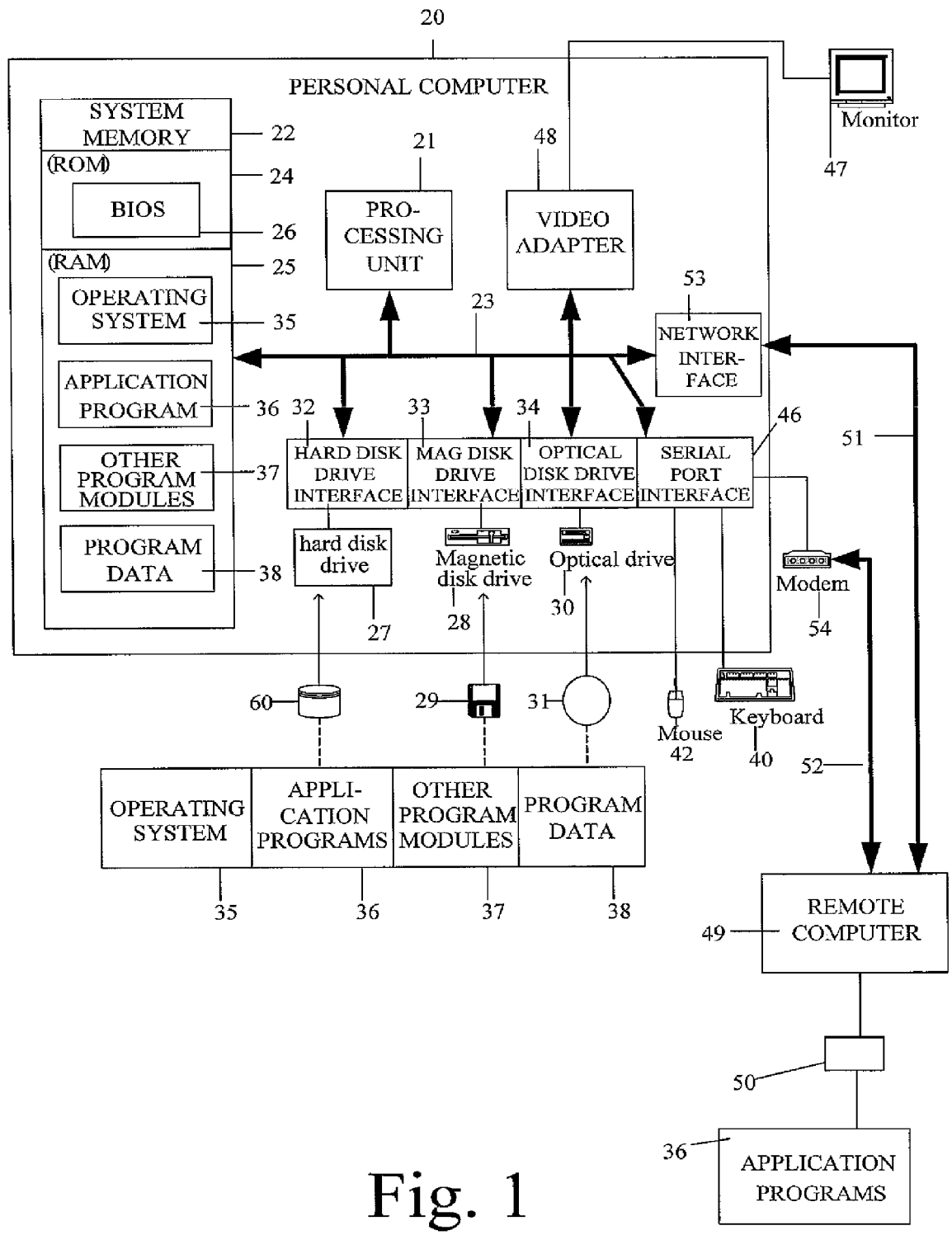
FIG. 1 is a block diagram generally illustrating an exemplary computer system on which the present invention may be performed.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices may include a microphone, joystick, game pad, or the like. The input devices may further include image-capturing devices, such as scanners and digital cameras, as sources of color image data. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
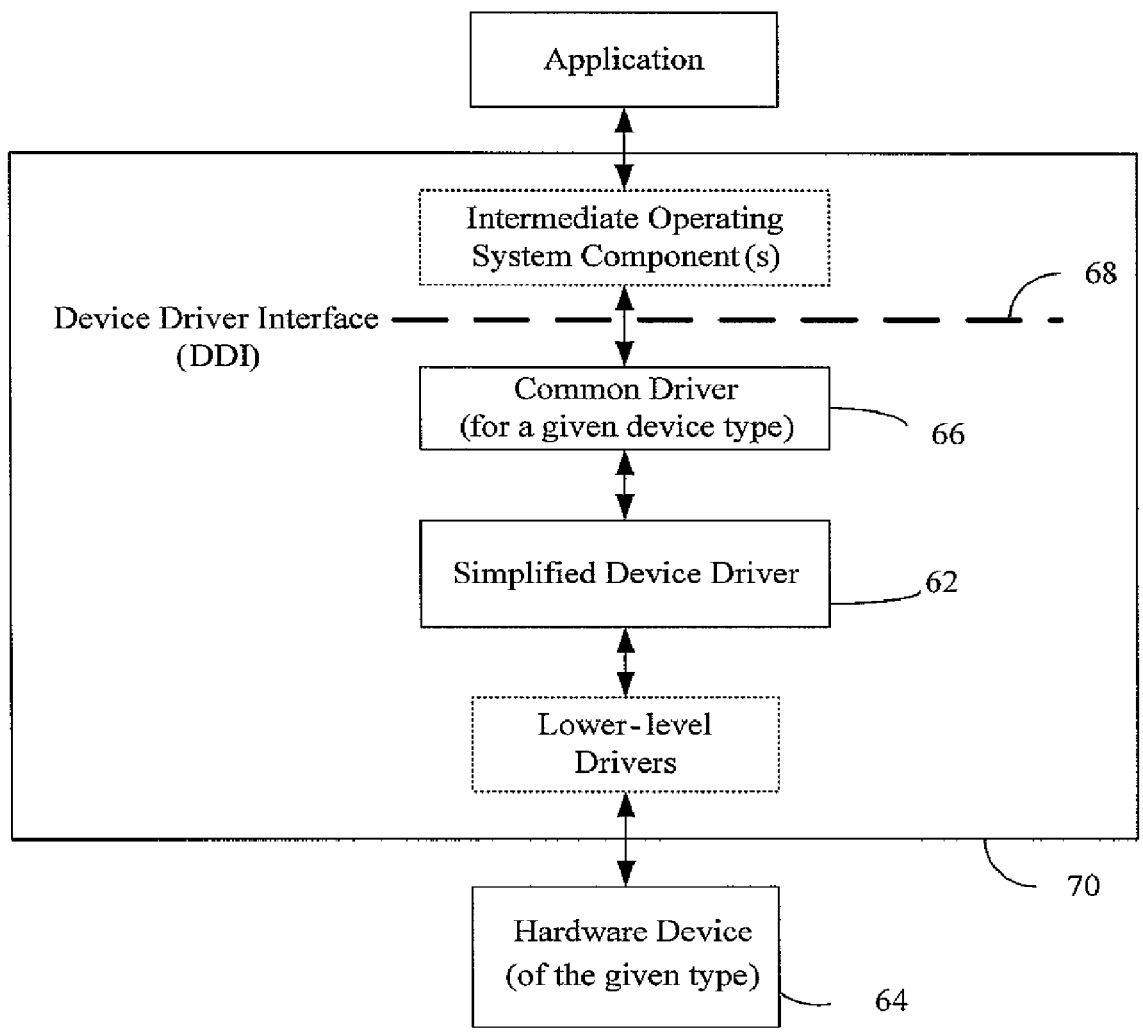
FIG. 2 is a schematic diagram showing a general view of a system that employs a simplified device driver in accordance with the invention.

Referring now to FIG. 2, the present invention is directed to a system architecture that enables the use of a "simplified" device driver 62 for controlling the operation of a hardware device 64. The simplified device driver is significantly easier to develop and to debug than regular device drivers. As a result, hardware vendors are likely to be able to develop high-quality simplified device drivers that do not require extensive fixing. As will be described in greater detail below, the simplification of the device drivers in accordance with the invention is achieved by using a "common" driver 66 for a given type of hardware devices, such as flatbed scanners, that works together with "simplified" device drivers for different devices of that given type. The common behavior between the different models of devices 64 of the given type is abstracted into the common driver 66, which preferably is system-supplied. Specifically, the simplified device drivers are required to implement functions responsive to a small set of pre-selected simple operation commands from the common driver that are "generic" to the given type of devices. Using the pre-selected set of commands, the common driver can operate devices of that type through their respective simplified drivers to provide their functionality. For example, the set of commands may include simple input/output (I/O) operations such as "SET" and "GET" operations that are generic in use, but the specific operations performed by the simplified driver to carry out the commands depend on the target device. The common driver is not required to have knowledge of the specifics of the simplified driver.

In contrast to the common driver, the simplified device driver 62 for a particular device 64 implements any needed device behavior specific to the device and is expected to be provided by the vendor of that device. As described above, the common driver can send a finite set of commands to the simplified device driver of a target device to accomplish tasks. The simplified driver can implement any method to translate the generic commands from the common driver into device specific operations. The common driver is not concerned with the details of such device specific operations and preferably only has to be informed of the success/failure status of these commands.

By way of example, in an embodiment where the devices are scanners, the common driver may send a command to set the X resolution (e.g., "CMD_SET_X_RESOLUTION") to the simplified driver of a scanner with the intended value of the X resolution. The simplified driver interprets the command as an intention to set the X resolution, and issues the correct sequence of commands to the associated scanner with the specified x resolution value. The simplified driver then returns a response to the common driver indicating whether the setting operation is successful.

In the following description, the invention will be described in the context of an embodiment based on the Windows Image Acquisition (WIA) architecture, which is part of the Windows operating system of Microsoft Corporation. Moreover, the invention will be described using flatbed scanners as one example of the different types of hardware devices for which simplified device drivers can be advantageously used. It will be appreciated, however, that the approach of employing simplified device-specific drivers in accordance with the invention can be effectively used in other types of operating systems. Moreover, the invention is not limited only to flatbed scanners but can be advantageously applied to other types of computer peripheral devices, where a common set of generic operations can be defined for different models of the devices.

Figure 3:
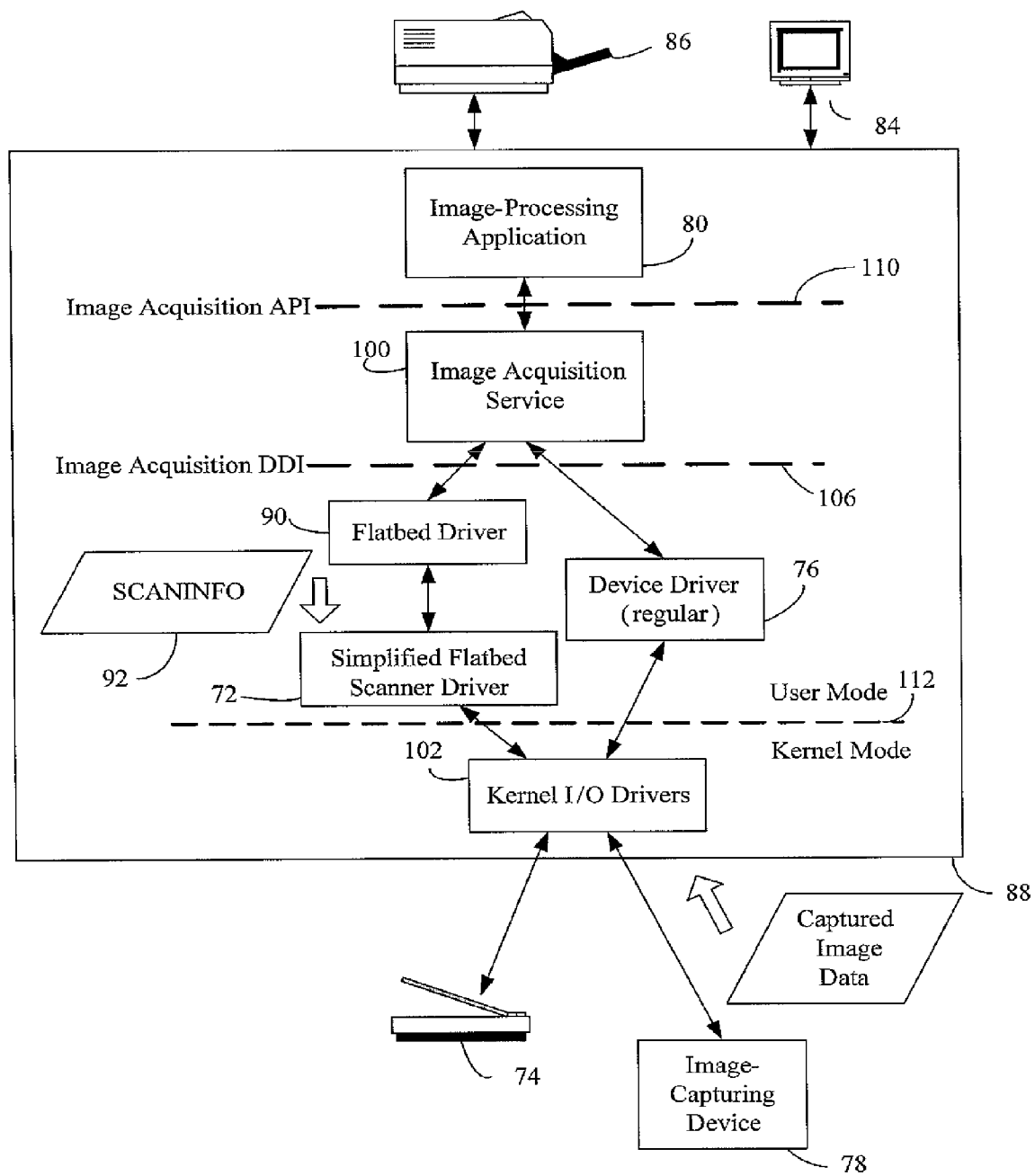
FIG. 3 is an embodiment of an image acquisition system that has a simplified device driver for a flatbed scanner.

Referring now to FIG. 3, the operating system of the shown embodiment employs an image acquisition architecture that is designed to enable an image-processing application 80 to effectively communicate with and control the operations of various image-capturing devices, such as scanners and digital cameras. To illustrate the concept of using simplified device drivers in accordance with the invention, a simplified device driver 72 for a flatbed scanner 74 is juxtaposed with a regular device driver 76 for another image-capturing device 78, and the image acquisition architecture is described in connection with the regular device driver to allow an appreciation of the advantages of using the simplified device driver.

In the embodiment of FIG. 3, the image-capturing device 78 functions as a source of color image data, which can be transmitted to an image-processing application 80 for various types of processing and editing operations. The processed or edited color image may then be displayed on a color display device (such as a computer monitor 84) for viewing, printed on a printer 86, or included in a document for presentation or communication purposes.

The image acquisition architecture of the operating system 88 includes a system-supplied image acquisition service 100, which servers as an intermediate between the application 80 and the device drivers for various image-capturing devices, such as the image-capturing device 78 (which may be a scanner, a digital camera, etc.) and the flatbed scanner 74. The image-processing application 80 communicates with the image acquisition service 100 through an image acquisition Application Programming Interface (API) 110 provided by the operating system 88. When the application 80 makes a request to use one of the image capturing devices, the image acquisition service 100 directs the request to the device driver for that image-capturing device. Communicating with the device driver 76 through the image acquisition service 100, the image processing application 80 can monitor, communicate with, and receive captured color image data from the image-capturing device 78.

The device driver 76 is typically supplied by the vendor of the associated image-capturing device 78. In the illustrated embodiment, the device driver 80 is a user-mode component that directs image acquisition property changes and commands to its associated image-capturing device 70. It communicates through a device-specific user-mode interface 112 with system-supplied or vendor-supplied kernel-mode I/O device drivers 102, which drives the image-capturing device 78 through a driver such as a USB driver. The kernel-mode image drivers 102, which are bus-specific, package data for delivery to the image-capturing device 78 and transfer data from the image-capturing device to the device driver 80. The communications between the kernel-mode image driver 102 and the image-capturing device 78 may be based on one of different types of buses. For instance, in one implementation, kernel-mode image drivers for the USB, SCSI, and IEEE 1394 buses are provided with the operating system 88.

In the opposite direction of the command/data flow, the device driver 76 communicates with the image acquisition service 100 through a Device Driver Interface (DDT) 106. The image acquisition DDI 106 allows the image acquisition service 100 to communicate with and control the device driver 76. Requests made by the application 80 concerning the image-capturing device 78 are directed to the image acquisition service 100, which in turn directs the requests to the appropriate device driver 76 through the image acquisition Device Driver Interface (DDI) 106. To work with the image acquisition DDI 106, the device driver 76 is required to implement various pre-defined interface methods for communications with the Image Acquisition Service 100. The interface methods perform device-related tasks such as: creating a tree-like data structure (called a "device tree") with items representing the device and its images and folders; reading and writing properties of the items in the device tree; transferring captured image data from the image-capturing device; enumerating device image formats supported by the device; deleting an item in the device tree; sending operation commands to the device; enumerating device capabilities; and obtaining device error message strings.

It can be seen from this example that to implement the required DDI interface methods in a regular device driver for an image-capturing device, a hardware vendor has to have a good understanding of the image-acquisition architecture of the operation system and to follow carefully the specifications of the methods and their parameters. Due to the relatively large number and complexity of the required interface methods, the proper development of a regular device driver 76 for an image-capturing device can require significant time and resources. The hardware vendor of the device 78 may find it difficult to allocate the needed resources for driver development, especially when the device is a low-end model. This problem, of course, is not peculiar to image-capturing devices but is a general one for vendor-provided device drivers.

The use of simplified device drivers in accordance with the invention effectively solves this problem. Specifically, rather than implementing all the device driver interface methods required of a regular device driver (e.g., the driver 76), a simplified device driver for a device of a given type only has to implement entry point functions pertaining to a very small set of operation commands generic to devices of the given type. Those entry point functions allow the simplified device driver to be accessed by a common driver for the given device type. The common driver, preferably system-supplied, handles the device driver interface methods as required by the system architecture, and communicates with the simplified device driver through the entry point functions implemented therein. In this way, the system-supplied common driver and the vendor-supplied simplified device driver together function like a regular device driver (such as the device driver 76). Since the simplified device driver does not have to implement the complicated system interface methods, it is significantly easier for the hardware vendor to develop. The hardware vendor only has to focus on device-specific behavior, which it knows best, in writing the simplified device driver to perform operations for carrying out the small set of commands from the common driver.

For instance, in the illustrated embodiment, the image acquisition architecture requires a regular device driver 76 to handle the management and validation of the settings of image acquisition properties according to rules defined as part of the architecture. With the combination of a common driver and one or more simplified drivers, the common driver controls the various aspects of the property management and validation. Thus, a simplified driver does not have to deal with property management and validation, and only has to handle property setting negotiations and data acquisition operations.

In one embodiment, the installation of a simplified device driver requires additional entries in the installation file (.INF). First, an entry is included in the device data section of the .INF file to indicate that the device driver is a "simplified" one rather than a regular driver. The value of this entry is set to be the name of the file (in this embodiment a .DLL file) that implements the simplified device driver. Moreover, in an "Add to Register" section where a regular device driver would normally be referenced, the file that implements the common driver is listed as the driver for the device.

In the embodiment of the image-acquisition system shown in FIG. 3, the common driver for flatbed scanners is referred to as the "Flatbed Driver" 90. The Flatbed Driver 90 may be used together with a plurality of simplified device drivers, referred to as "simplified scanner drivers," for flatbed scanners that may be of different models from different hardware vendors. Each of the simplified scanner drivers is required to implement entry point functions for corresponding operation commands generic to those flatbed scanners. Specifically, there are only four entry point functions that the simplified scanner driver 72 has to implement: MicroEntry, GetScanInfo, SetPixelWindow, and Scan. The purposes of these functions and their parameters are described in greater detail below.

When the application 80 makes a request concerning the flatbed scanner 74, the request is passed by the Image Acquisition Service 100 to the Flatbed Driver 90. The Flatbed Driver 90 handles the request by sending commands, i.e., calling the entry point functions in the simplified scanner driver 72 for that scanner 74, to perform the requested operation. Also, a data structure 92 called "SCAN-INFO" is passed to the simplified scanner driver 72 to communicate scanning parameters such as scan window and resolutions. This data structure and other data structures used by the simplified scanner driver 72 will be described in the "Structure Definitions" section below. The Flatbed Driver reads values form the SCANINFO structure, but does not write them. It is the simplified scanner's responsibility to set the data members of the SCANINFO structure. The simplified scanner driver relies on the values stored in the SCANINFO for a scan and does not separately store any parameters for that scan. This allows the simplified driver to support access to the scanner by multiple applications. For instance, if two applications are setting up scans on the same scanner at the same time, there will be only one copy of the simplified driver running. In this situation, the simplified driver will be called with one of two different SCANINFO structures depending on which application is trying to access the scanner.

I. Required Entry Point Functions

A. The MicroEntry Function

The MicroEntry function is defined as:

```
HRESULT MicroEntry(
    LONG lCommand
    PVAL pValue
);
```

This function is used by the Flatbed Driver to dispatch commands to the simplified driver. As to the parameters, lCommand represents a command issued to the simplified scanner driver by the Flatbed Driver. The parameter pValue is a pointer to a VAL structure that specifies data related to the corresponding lCommand. The valid pVal data members are described in a Command Reference Section below. If the function succeeds, the VAL structure pointed to by pValue should contain valid data related to the corresponding lCommand issued. If the function fails, error information can be set in the lVal member of the VAL structure. For any command not supported by the simplified driver, a value "E_NOTIMPL" will be returned. The list of required commands to be supported by the simplified driver is provided in the Required Command section below. Most of the commands sent to MicroEntry are used to set parameters of a scan operation by the flatbed scanner. The simplified scanner driver sends the settings down to the flatbed scanner.

B. The GetScanInfo Function

The GetScanInfo function is defined as

```
HRESULT GetScanInfo(
    PSCANINFO pScanInfo
);
```

This function returns the valid and current values for all of the scanner's properties. The parameter pScanInfo is a pointer to a SCANINFO structure that contains information about the simplified scanner driver's current and valid settings.

C. The SetPixelWindow Function

The SetPixelWindow function is defined as:

```
HRESULT SetPixelWindow
    PSCANINFO   pScanInfo,
    LONG        x,
    LONG        y,
    LONG        xExtent,
    LONG        yExtent
);
```

This function is used to set the area to be scanned. The parameter pScanInfo, as described above, is a pointer to a SCANINFO structure that represents the simplified scanner driver. This data structure is stored by the Flatbed Driver to guarantee synchronized settings between the simplified driver and the Flatbed Driver. The parameters x and y represent the upper left x and y coordinates, respectively, of a selected rectangle. The parameter xExtent and yExtent represent the width and height, respectively, of the selected rectangle. These coordinate values are in terms of pixels. In response, the simplified scanner driver will send commands to the flatbed scanner to set the window, and perform any device-specific adjustments if necessary.

D. The Scan Function

The Scan function is defined as:

```
HRESULT Scan
    PSCANINFO   pScanInfo,
    LONG        lPhase,
    PBYTE       pBuffer,
    LONG        lLength
);
```

This function initiates the scan and returns scanned image data from the simplified device driver to the Flatbed driver. The Flatbed driver may then forward the scanned data to an image-processing application through the Image Acquisition Service. The parameter pScanInfo has been described above.

The parameter lPhase indicates the requested scan phase. Valid values of this parameter include: SCAN_FIRST SCAN_NEXT, and SCAN_FINISH. SCAN_FIRST is the first phase sent to the simplified driver, which should initialize and prepare the scanner to scan as well as initiate the scan. The scanned data should be returned from this call. To that end, the parameter pBuffer points the buffer memory space to be filed with the scanned data. This buffer is allocated by the Flatbed Driver, and its length is specified by the parameter lLength, which is the requested amount of data to be scanned. The value of the parameter pReceived indicates the amount of data actually scanned into the buffer. This value should not exceed the value of lLength. The phase SCAN_NEXT is repeatedly called during the data transfer. The phase SCAN_FINISH will be called to terminate the scanning process. It is called even if the user cancels the scan. In response, the simplified driver should stop the transfer of scanned data and reset the scanner to a "power-on" state (ready for another transfer).

II. Required Commands

As described above, commands are passed to the simplified scanner driver in the MicroEntry( ) function. Commands that are required to be supported by the simplified driver are described in this section. It should be appreciated that there may be other possible commands that the simplified scanner driver may support.

A. Parameter Setting Commands

CMD_INITIALIZE—This command initializes the simplified scanner driver and sets the driver IO handles to valid values. This command is sent by the Flatbed Driver when the Image Acquisition Service calls an Initialize( ) function on the Flatbed Driver. The Flatbed Driver will automatically create one device IO handle and put it in the DeviceIOHandles[ ] array of the passed SCANINFO structure at index 0. the simplified driver should use this handle when it needs to communicate with the device. If the simplified driver needs additional device handles, (e.g., to use multiple bulk USB pipes), they can be created and stored in the DeviceIOHandles[ ] array up to a maximum number of MAX_IO_HANDLES, by using the CreateFile name stored in szVal.

CMD_UNINITIALIZE—This function uninitializes the simplified scanner driver and closes the device IO handles. The Flatbed Driver will automatically close the device IO handle in the DeviceIOHandles[ ] array of the SCANINFO structure at index 0. This command will be sent to be simplified scanner driver when the Flatbed Driver is unloading.

CMD_STI_DEVICERESET—This function is called by the Flatbed Driver to reset the flatbed scanner.

CMD_STI_DIAGNOSTIC—This function is called by the Flatbed Driver when the user requests to test the flatbed scanner.

CMD_RESETSCANNER—This function is called by the Flatbed Driver to reset the flatbed scanner.

CMD_SETXRESOLUTION—This function is called by the Flatbed Driver to set the horizontal scan resolution. The desired resolution in pixels is passed in the lVal member of the passed VAL structure. This value is to be sent down to the scanner by the simplified scanner driver.

CMD_SETYRESOLUTION—This function is called by the Flatbed Driver to set the vertical scan resolution. The desired resolution in pixels is passed in the lVal member of the passed VAL structure. This value is to be sent down to the flatbed scanner by the simplified scanner driver.

CMD_SETDATATYPE—This function is called by the Flatbed Driver to set the data type for the scan. The desired type is passed in the lVal member of the passed VAL structure and may be one of the following:

| | |
|---|---|
| WIA_DATA_THRESHOLD | (1-bit) |
| WIA_DATA_GRAYSCALE | (8-bit) |
| WIA_DATA_COLOR | (24-bit) |

CMD_SETINTENSITY—This function is called by the Flatbed Driver to set the intensity value for the scan. The desired intensity value is passed in the lVal member of the passed VAL structure. The value −1000 should be interpreted as the lowest brightness, 0 as nominal, and 1000 as the device's maximum brightness. This setting is to be sent down by the simplified scanner driver to the flatbed scanner.

CMD_SETCONTRAST—This function is called by the Flatbed Driver to set the contrast value for the scan. The desired contrast value is passed in the lVal member of the passed VAL structure. The value −1000 should be interpreted as the lowest contrast, 0 as nominal, and 1000 as the device's maximum contrast. This setting is to be sent down by the simplified scanner driver to the flatbed scanner.

CMD_GETCAPABILITIES—This function is called by the Flatbed Driver to get information on the button events of the flatbed scanner. Three members of the passed VAL structure should be filled in. The value of lVal should be set to the number of buttons. The member pGuid should be set to point to an array of event GUIDs. The member lReserved can optionally be set to a WCHAR* array that contains the button names in the same order as they are in the array pointed to by pGuid (e.g., "Scan Button," "Fax Button," etc.). The arrays can be allocated in response to CMD_INITIALIZE and freed in CMD_UNINITIALIZE.

B. Event Support Commands

CMD_STI_GETSTATUS—This event is called by the Flatbed Driver to get the on-line status of the device and, if the device has push buttons, to get the button status. The simplified scanner driver should set the lVal member of the passed VAL structure to 1 if the scanner is on-line and functioning properly. If lVal is set to any other value other than 1, the scanner is considered offline, and it will fail the device test in the control panel of the operating system. If the device supports buttons and a button was pressed, the pGuid member of the passed VAL structure should be set to the GUID of the button event. If there were no button pressed, this value should be set to GUID_NULL to signal that there are no events pending.

CMD_GET_INTERRUPT_EVENT—This function is called by the Flatbed Driver to get the status on possible button events that use interrupts (i.e., for USB devices which report events via the interrupt pipe) from the device. If the device only supports polling, this command need not be implemented.

Some of the members of the VAL structure used in the commands are described below:

lVal—This member of the passed VAL structure should be set to a pointer to a signal event HANDLE. This HANDLE is used to signal to the Flatbed Driver that an event has happened. The simplified Device Driver should call SetEvent( ) on the handle to signal the event.

handle—This member will contain the HANDLE of the ShutDownEvent. This event is signaled only when the device is being unloaded or shut down.

pGuid—This member is set to be the GUID of the button event that was "pushed." If there were no button presses, its value is set to GUID_NULL to signal that there are no events pending.

szVal—This member will be the DeviceIO Name in ASCII form. The simplified driver can use this member to call a CreateFile( ) function and get a DeviceIO handle if needed for interrupt checking.

C. Automatic Document Feeder Commands

The flatbed scanners using simplified scanner drivers may support limited automatic document feeder (ADF) control. To report that it supports automatic document feeding, a simplified driver may set the "ADF" member in the SCAN-INFO structure to 1. This will cause the Flatbed Driver to add the needed properties for automatic document feeder control.

CMD_LOADADF—This function is called by the Flatbed Driver to load a page into the automatic document feeder.

CMD_UNLOADADF—This function is called by the Flatbed Driver to unload a page from the automatic document feeder.

CMD_ADFGETSTATUS—This function is called by the Flatbed Driver to get the status CMD_ADFHASPAPER—This function is called by the Flatbed Driver to get the paper status of the automatic document feeder.

III. Structure Definitions

The data structures used in the entry point functions and commands of the simplified driver as described above are defined as follows:

```
#ifndef _WIAMICRO_H
#define _WIAMICRO_H
#pragma once
#include <pshpack8.h>
#define WIAMICRO_API __declspec(dllexport)
// common includes
#include <SCSISCAN.H>
//
// Private #defines
#define MAX_IO_HANDLES      16
#define MAX_RESERVED         4
#define MAX_ANSI_CHAR      255
//
// Common BUS types
#define BUS_TYPE_SCSI              200
#define BUS_TYPE_USB               201
#define BUS_TYPE_PARALLEL          202
#define BUS_TYPE_FIREWIRE          203
//
// command list
#define SCAN_FIRST                  10
#define SCAN_NEXT                   20
#define SCAN_FINISHED               30
#define SCANMODE_FINALSCAN           0
#define SCANMODE_PREVIEWSCAN         1
#define CMD_INITIALIZE             100
#define CMD_UNINITIALIZE           101
#define CMD_SETXRESOLUTION         102
#define CMD_SETYRESOLUTION         103
#define CMD_SETCONTRAST            104
```

-continued

```
#define CMD_SETINTENSITY                    105
#define CMD_SETDATATYPE                     106
#define CMD_SETDITHER                       107
#define CMD_SETMIRROR                       108
#define CMD_SETNEGATIVE                     109
#define CMD_SETTONEMAP                      110
#define CMD_SETCOLORDITHER                  111
#define CMD_SETMATRIX                       112
#define CMD_SETSPEED                        113
#define CMD_SETFILTER                       114
#define CMD_LOAD_ADF                        115
#define CMD_UNLOAD_ADF                      116
#define CMD_GETADFAVAILABLE                 117
#define CMD_GETADFOPEN                      118
#define CMD_GETADFREADY                     119
#define CMD_GETADFHASPAPER                  120
#define CMD_GETADFSTATUS                    121
#define CMD_GETADFUNLOADREADY               122
#define CMD_GETTPAAVAILABLE                 123
#define CMD_GETTPAOPENED                    124
#define CMD_TPAREADY                        125
#define CMD_SETLAMP                         126
#define CMD_SENDSCSICOMMAND                 127
#define CMD_STI_DEVICERESET                 128
#define CMD_STI_GETSTATUS                   129
#define CMD_STI_DIAGNOSTIC                  130
#define CMD_RESETSCANNER                    131
#define CMD_GETCAPABILITIES                 132
#define CMD_GET_INTERRUPT_EVENT              133
#define CMD_SETGSDNAME                      134
#define CMD_SETSCANMODE                     135
#define CMD_SETSTIDEVICEHKEY                136
#define CMD_GETSUPPORTEDFILEFORMATS         138
#define CMD_GETSUPPORTEDMEMORYFORMATS       139
#define SUPPORT_COLOR          0x00000001
#define SUPPORT_BW             0x00000002
#define SUPPORT_GRAYSCALE      0x00000004
//
// Error Codes
#define MCRO_ERROR_GENERAL_ERROR      0 // All lVal values are
                                        initialized to '0'
#define MCRO_STATUS_OK                1 // General success
                                        status return
#define MCRO_ERROR_PAPER_JAM          2 // ADF has a paper Jam
#define MCRO_ERROR_PAPER_PROBLEM      3 // ADF has a paper
                                        problem
#define MCRO_ERROR_PAPER_EMPTY        4 // ADF has no paper
#define MCRO_ERROR_OFFLINE            5 // ADF or Device is
                                        offline
#define MCRO_ERROR_USER_INTERVENTION  6 // User needs to
                                        interact with the
                                        physical device
//
// WIA compatible #defines
#define WIA_PACKED_PIXEL         0
#define WIA_PLANAR               1
#define WIA_ORDER_RGB            0
#define WIA_ORDER_BGR            1
#define WIA_DATA_THRESHOLD       0
#define WIA_DATA_DITHER          1
#define WIA_DATA_GRAYSCALE       2
#define WIA_DATA_COLOR           3
#define WIA_DATA_COLOR_THRESHOLD 4
#define WIA_DATA_COLOR_DITHER    5
//
// structure definitions
typedef struct _RANGEVALUE {
    LONG lMin;              // minimum value
    LONG lMax;              // maximum value
    LONG lStep;             // increment/step value
} RANGEVALUE, *PRANGEVALUE;
typedef struct _SCANWINDOW {
    LONG xPos;              // X position (left)
    LONG yPos;              // Y position (top)
    LONG xExtent;           // X extent (right)
    LONG yExtent;           // Y extent (bottom)
```

-continued

```
} SCANWINDOW, *PSCANWINDOW;
typedef struct _SCANINFO {
    // Common Scanner specs
    LONG ADF;                              // (0 - no support, 1 -
                                           //  supported, 2 - supported
                                           //  and It can duplex)
    LONG TPA;                              // (0 - no support, 1 -
                                           //  supported)
    LONG Endorser;                         // (0 - no endorser, 1 -
                                           //  supported)
    LONG OpticalXResolution;               // (dpi setting of optics)
    LONG OpticalYResolution;               // (dpi setting of optics)
    LONG BedWidth;                         // (bed width in 1000's of an
                                           //  inch)
    LONG BedHeight;                        // (bed height in 1000's of an
                                           //  inch)
    RANGEVALUE IntensityRange;             // (Intensity/Brightness
                                           //  ranges)
    RANGEVALUE ContrastRange;              // (Contrast ranges)
    LONG SupportedCompressionType;         // (mask of supported
                                           //  compression types, 0 -
                                           //  None)
    LONG SupportedDataTypes;               // (mask of supported types,
                                           //  (ie.
                                           //  SUPPORT_COLOR|SUPPORT_BW...
                                           //  ))
    // Current Image Info
    LONG WidthPixels;                      // (width of image, using
                                           //  current scanner settings in
                                           //  pixels)
    LONG WidthBytes;                       // (width of image, using
                                           //  current scanner settings in
                                           //  bytes)
    LONG Lines;                            // (height of image, using
                                           //  current scanner settings in
                                           //  pixles)
    LONG DataType;                         // (current data type set)
    LONG PixelBits;                        // (current bit depth setting)
    // Current Scanner settings
    LONG Intensity;                        // (current
                                           //  Intensity/Brightness
                                           //  setting)
    LONG Contrast;                         // (current contrast setting)
    LONG Xresolution;                      // (current X Resolution)
    LONG Yresolution;                      // (current Y Resolution
    SCANWINDOW Window;                     // (current scanner window
                                           //  settings)
    // Scanner options
    LONG DitherPattern;
    LONG Negative;                         // (0 - off, 1 - Negative is
                                           //  on)
    LONG Mirror;                           // (0 - off, 1 - Mirror is on)
    LONG AutoBack;                         // (0 - off, 1 - AutoBack is
                                           //  on)
    LONG ColorDitherPattern;               // (dither pattern??)
    LONG ToneMap;                          // (tone map ??)
    LONG Compression;                      // (0 - off, 1 - Compression
                                           //  is on)
    LONG RawDataFormat;                    // (0 - Packed data, 1 -
                                           //  Planar data)
    LONG RawPixelOrder;                    // (0 - RGB, 1 - BGR)
    LONG bNeedDataAlignment;               // (0 - FALSE, 1 - TRUE)
    LONG DelayBetweenRead;                 // delay between WIA Scan( )
                                           //  calls requesting data
                                           //  (milliseconds)
    LONG MaxBufferSize;                    // maximum buffer size in
                                           //  scanner
    HANDLE
    DeviceIOHandles[MAX_IO_HANDLES];       // Device IO
                                           //  handles needed for device
                                           //  communication
    LONG lReserved[MAX_RESERVED];          // (silly reserved bits)
```

-continued

```
}SCANINFO, *PSCANINFO;
typedef struct VAL {
    LONG        lVal;                       // long value
    double      dblVal;                     // float/double value
    GUID        *pGuid;                     // GUID pointer
    PSCANINFO   pScanInfo;                  // pointer to the shared
                                            //     ScanInfo struct
    HGLOBAL     handle;                     // handle value
    WCHAR       **ppButtonNames;            // pointer to button names
                                            //     array
    HANDLE      *pHandle;                   // pointer to a Handle
                                            //     value
    LONG        lReserved;                  // lone value
    CHAR        szVal[MAX_ANSI_CHAR];       // ANSI string
}VAL, *PVAL;
//
// Micro driver entry points
WIAMICRO_API HRESULT MicroEntry(LONG lCommand, PVAL pValue);
WIAMICRO_API HRESULT Scan(PSCANINFO pScanInfo, LONG lPhase,
PBYTE pBuffer, LONG lLength, LONG *plReceived);
WIAMICRO_API HRESULT SetPixelWindow(PSCANINFO pScanInfo, LONG
x, LONG y, LONG xExtent, LONG yExtent);
//
// optional debug trace
VOID Trace(LPCTSTR Format, ...);
#include <poppack.h>
#endif
```

As mentioned above, one of the important advantages of using simplified device drivers is that they are very easy for hardware vendors to develop. This is because they only have to implement the very simple entry point functions for interacting with the common driver and to handle device-specific aspects of controlling the device to perform pre-selected basic operations generic to devices of that type. The task of handling the complicated interfacing with the high-level operating system components is taken care of by the system-supplied common device driver.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method implemented at least in part by a computer comprising:

passing, through a device driver interface to a first device driver, a request. from the application for a requested operation by the hardware device;

calling, by the first device driver, a second device driver through entry point functions of the second device driver, the entry point functions corresponding to a pre-selected set of operation commands generic to different device models and brands of said given device type, and controlling, by the second device driver in response to the calling of the entry point functions by the first driver and translating the pre-selected set of operation commands specific to the hardware device, the hardware device to perform the requested operation, wherein the entry point functions perform actions including setting parameters of the requested operation and initializing the requested operation and the first device driver is not required to have knowledge of the operation commands specific to the hardware device.

2. A method as in claim 1, wherein the step of calling includes passing a data structure to the second device driver for storing operation parameter settings by the second device driver.

3. A method as in claim 2, wherein the hardware device is an image-capturing device.

4. A method as in claim 3, wherein the hardware device is a flatbed scanner.

5. A system having a processor and a memory coupled to the processor, the system comprising:

means for passing, through a device driver interface to a first device driver, a request from an application for a requested operation by a hardware device of a given device type installed in the system;

means for calling, by the first device driver, a second device driver through entry point functions of the second device driver, the entry point functions corresponding to a pre-selected set of operation commands generic to different device models and brands of said given device type, and controlling, by the second device driver in response to the calling of the entry point functions by the first driver and translating the pre-selected set of operation commands into operation commands specific to the hardware device, the hardware device to perform the requested operation, wherein the entry point functions perform actions including setting parameters associated with the requested operation and initializing the requested operation and the first device driver is not required to have knowledge of the operation commands specific to the hardware device.

6. A system as in claim 5, wherein the means for calling includes passing a data structure to the second device driver for storing operation parameter settings by the second device driver.

7. A system as in claim 6, wherein the hardware device is an image-capturing device.

8. A system as in claim 7, wherein the hardware device is a flatbed scanner.

9. One or more computer-readable media having a tangible component and computer-readable instructions therein that, when executed by a computer system, cause the computer system to perform a method comprising:

interacting, by a first device driver not required to have knowledge of operation commands specific to a hardware device, with an application running on the computer system through a device driver interface to receive from the application a request for performing a requested operation by the hardware device;

setting parameters associated with the requested operation; and calling, by the first device driver and with the parameters, entry point functions of a second device driver capable of translating a pre-selected set of operation commands generic to different device models and brands of the given device type into operation commands specific to the hardware device to control the hardware device to perform the requested operation, the entry point functions corresponding to the pre-selected set of operation commands generic to the different device models and brands of the given device type and callable by the first device driver for controlling operations of said hardware device.

10. The media of claim 9, where in the hardware device is an image-capturing device.

11. The media of claim 10, wherein the image-capturing device is a flatbed scanner.

12. The media of claim 11, wherein the requested operation is a scan operation.

13. The media of claim 12, wherein the entry point functions of the second device driver are callable to set parameters for the scan operation, and to initiate the scan operation.

14. The media of claim 9, further comprising passing to the second device driver a data structure for storing parameters associated with the requested operation.

* * * * *

UNITED STATES PATENT AND TRADEMARK OFFICE
CERTIFICATE OF CORRECTION

| | | |
|---|---|---|
| PATENT NO. | : 7,322,035 B2 | Page 1 of 1 |
| APPLICATION NO. | : 11/276481 | |
| DATED | : January 22, 2008 | |
| INVENTOR(S) | : Vladimir Sadovsky et al. | |

It is certified that error appears in the above-identified patent and that said Letters Patent is hereby corrected as shown below:

In column 17, line 55, in Claim 1, delete "request." and insert -- request --, therefor.

Signed and Sealed this

Twenty-second Day of February, 2011

David J. Kappos
*Director of the United States Patent and Trademark Office*